(No Model.) 2 Sheets—Sheet 1.
G. ICKEN.
CORN PLANTER.
No. 346,550. Patented Aug. 3, 1886.
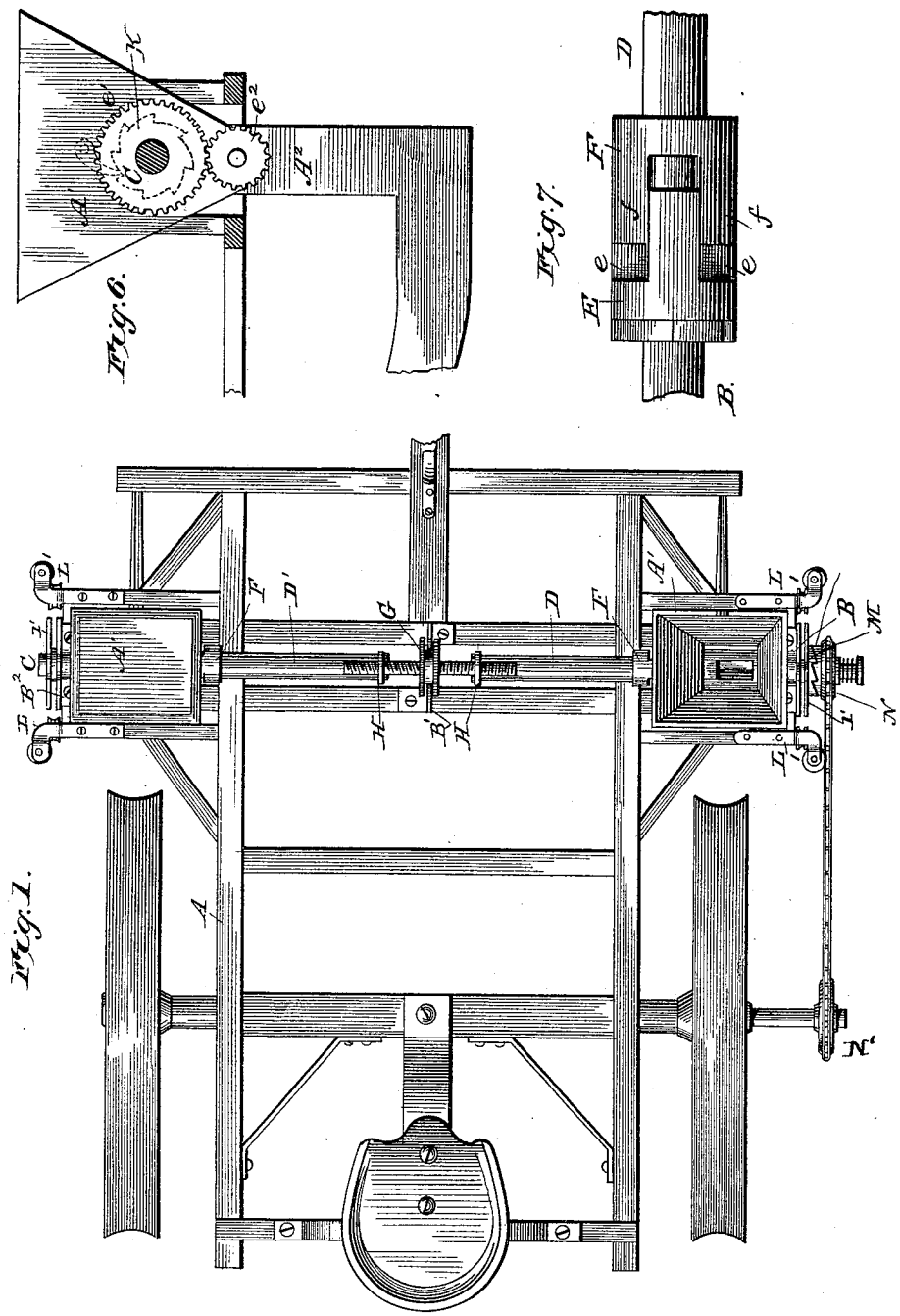
WITNESSES
Fred. G. Dieterich
Newton Lovejoy
INVENTOR
Gustav Icken
By Edw. J. Underwood
Attorney (No Model.) 2 Sheets—Sheet 2.
G. ICKEN.
CORN PLANTER.
No. 346,550. Patented Aug. 3, 1886.
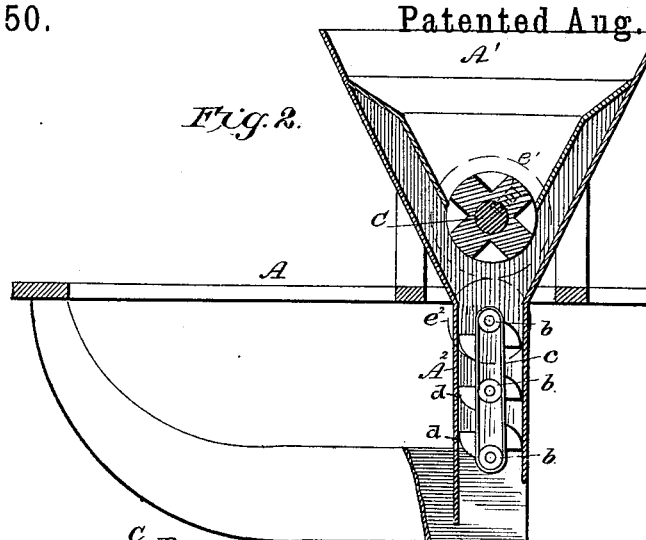
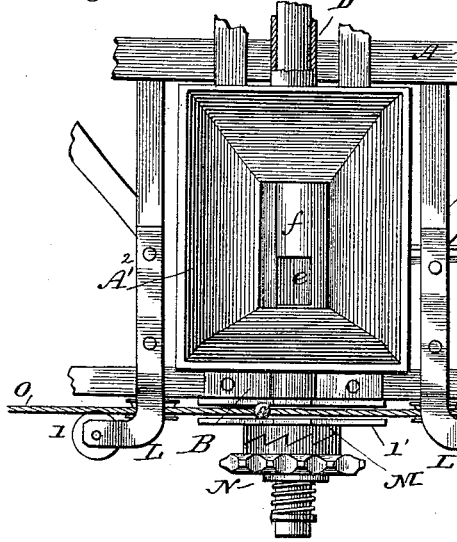
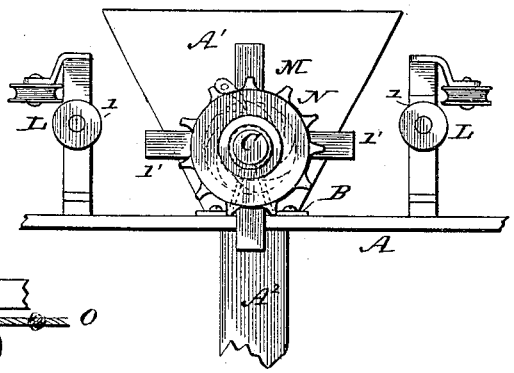
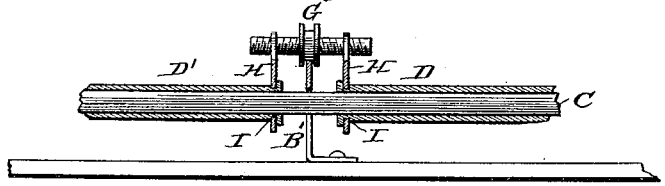
WITNESSES
Fred G. Dieterich
Newton Lovejoy
INVENTOR
Gustav Icken
By Edw. J. Underwood
Attorney
N. PETERS, Photo-Lithographer, Washington, D. C.

UNITED STATES PATENT OFFICE.

GUSTAV ICKEN, OF OMAHA, NEBRASKA.

CORN-PLANTER.

SPECIFICATION forming part of Letters Patent No. 346,550, dated August 3, 1886.

Application filed April 10, 1886. Serial No. 198,409. (No model.)

*To all whom it may concern:*

Be it known that I, GUSTAV ICKEN, a subject of the Emperor of Germany, residing at Omaha, in the county of Douglas and State of Nebraska, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of corn-planters known as "check-rowers;" and the invention consists in the novel construction and arrangement of parts, as will be hereinafter more fully described, and specifically pointed out in the claims.

In the accompanying drawings, to which reference is made, and which fully illustrate my invention, Figure 1 is a plan view. Fig. 2 is a sectional view of the seed box, cups, and belt. Fig. 3 is a detail plan view with the check-rower attached. Figs. 4, 5, 6, and 7 are detail views.

The letter A indicates a rectangular frame, upon which two double seed-boxes, A', are mounted, one at each end of the frame. The inner seed-box, which holds the corn, tapers down just sufficiently to cover and inclose the seed-cylinder, in order to guide the corn to the cells, and the outer box or hopper incloses both the inner box and the seed-cells. Connected with the lower end of the hopper, or made continuous therewith, is a metallic tube, A², leading down to and connected with the heel of a runner, which opens the furrow to receive the seed, and is bifurcated or hollowed at its rear to allow the seed to pass into the furrow. Journaled in the sides of the tube are a series of friction-rollers, $b$, over and around which passes an endless belt, $c$, provided with a series of grain-cups, $d$, each of which receives the charge of corn delivered from one of the grain-cells, $e$, carries it down to a point near the ground, and by its reversal delivers it to the furrow. Motion is imparted to this endless belt by a gear-wheel, $c^2$, placed upon the end of the upper friction-roller, $b$, which engages with another gear-wheel, $e'$, placed upon the longitudinal feed-shaft C.

B B' B² are hangers or supports, three in number, secured one at each end and one in the center of the frame A, through which passes a longitudinal shaft, C. Over this shaft C is snugly but loosely secured two sections of a tube or sleeve, D D', which move upon said shaft C, the ends being provided with a head, F, ending in semi-cylindrical or triangular bars $f$, which are arranged to move in slots $e$, of the same shape, in a fixed head, E, on the axle or shaft C, and as the bars are withdrawn from the slots by the action of the right and left thumb-screw G seed-cells are formed in the slots $e$ in the head E of greater or lesser dimensions, as desired. The ends of the thumb-screw G pass through perforations in the upper part of two hangers or supports, H, which are secured upon the inner ends of the tube-sections by means of circular grooves in the sections, and larger perforations I in the lower part of the hangers H, for the purpose of changing the dimensions of the seed-cells. The section D has a lateral or sliding motion on the shaft, controlled by the thumb-screw G, above described, and its teeth or bars enter the openings in the cylinder-head E to change the size of the seed-cups, and the section D' has also a sliding motion on the shaft, and is provided at or near its end with a head, F, and base $f$, to enter the slots $e$ in a head, E, on the shaft C. Thus each end of the shaft C carries a set of seed-cells and means of conveying the seed to the hill to be made in the furrow. The upper end of the central hanger, B', secured to the frame A, has a semicircular cut therein, within which is fitted the thumb-screw G, which traverses the openings in hangers H, and which operates the sectional sliding tubes D and D', at the end of each of which is located the seed-cups. Secured to the outer end of one of these seed-cups, or made integral therewith, and adjacent to the hanger B, is a ratchet-wheel, K, with which engages a pawl affixed within the seed-hopper, by means of which the revolution of the shaft C is regulated when the check-rower is used.

The frame A has secured to one end of it, upon each side of the shaft C, two double-curved hangers or supports, L, to each of which are secured upon their outer sides and ends two sheaves, $l$, having their planes placed or arranged at right angles to each other, and one sheave of each set a little below the other, the two lowest sheaves being in alignment with the arms l' of a forked or armed reel, M, located upon the end of the revolving shaft C, hereinbefore referred to. A pinion, N, regulated by a spiral spring, is secured to the driving end of a longitudinal shaft, C, which is adapted to engage with a sprocket-wheel, N', on the main shaft or axle of the planter, for the purpose of revolving the driving-shaft C, when desired to be so operated.

To the end of the shaft C carrying the forked or armed wheel is applied a suitable cord or wire, O, which has at regular distances apart a number of buttons strung thereon, or knots made therein, to contact with and give intermittent motion to the forked wheel M, this cord O being first staked down at one end of the field, and in the rear of the machine, and carried over the rear set of sheaves on the hangers, and between the arms of the marking-reel, (the peculiar disposition of the sheaves upon the hangers serving to retain the wire thereon,) thence to the front set of sheaves, thence carried across the field in the line of the proposed furrow, and staked down there, and as the planter is driven forward the knots will engage with the arms of the reel and revolve the shaft, emptying at each knot the charge of corn contained in one of the seed-cells into the cups d of the endless belt, and thence into the opened furrow.

By this construction of my device it will be obvious that the corn will be planted in hills at equal distances apart, the distance being determined by the location of the knots upon the wire.

By means of the thumb-screw G the seed-cups can be adjusted to plant a greater or less amount of seed, as desired.

In ordinary planters the services of two men are required, one to drive, the other to manipulate the seeder. By my device the latter is dispensed with, as the feed is automatic.

If desired, the check-rowing device may be placed at each end of the frame.

The operation of my device is as follows: One end of the marker being staked down to the ground at a suitable distance in the rear of the machine, the other or free end of the wire is passed around and over the rear sheaves, thence over the marking reel or guide, thence to and over the front sheaves, then stretched across the field, or any distance desired, and staked preparatory to planting. The seed-cups being now adjusted to the desired capacity, the planter is drawn forward in the direction in which the marker is aligned, and the arms or tappets of the reel striking the buttons or knots upon the wire or cord a certain amount of seed is delivered at that point in the rows where the hills are desired to be made. Thus each knot in the check-rower striking the guide-reel will carry the seed-shaft around one-quarter of a revolution and deliver the contents of one of the seed-cups to the point in the furrow where the hill is desired to be made.

This planter may be operated in the ordinary manner by removing the check-rower cords or wires, and when not used as a check-rower connection will be made directly from the main shaft or axle of the planter with the feed-shaft by gearing upon each—as, for instance, a sprocket-chain and sprocket-wheels on each axle or shaft.

It may be used for planting any kind of seed or grain which is deposited in hills.

Having thus described my invention, what I claim as new, and desire to secure by Letters Patent, is—

1. In a corn or seed planter, the combination of the hereinbefore-described double hopper or inner seed-box and outer case with the feed-shaft C, provided with the adjustable seed-cells, formed by the heads E F, and the slots e, and bars f, the right-and-left thumb-screw G, to change the capacity of the seed-cells, the tube through which the seed passes to the ground, the friction-rollers b, and the endless belt c, provided with its seed-cups, all substantially as described.

2. In a corn-planter, the combination of the double hopper, seed-cylinder E, provided with the seed-cells, constructed as described, the sleeves D D', arranged each side of the hanger B', the traversing-screw G, the shaft C, the ratchet-wheel K, and the marking-reel M, the same being a forked or armed wheel to be operated by the knotted cord or wire O, all constructed, arranged, and operating substantially as described.

3. In a corn-planter, the combination of the shaft C, sectional tubes or sleeves D D', hangers H and B', traversing or thumb screw G, seed-cylinder E, provided with the ratchet-wheel K and its pawl, the forked or armed wheel M, the same being operated by the knotted cord or wire O, engaging with the arms of the wheel, and the curved hangers L, constructed as described, and provided with sheaves l, located at right angles with each other, substantially as described.

In testimony whereof I affix my signature in presence of two witnesses.

GUSTAV ICKEN.

Witnesses:
HERMANN A. BODE,
N. J. JOHNSTON.